(12) United States Patent
Hay et al.

(10) Patent No.: US 6,278,811 B1
(45) Date of Patent: Aug. 21, 2001

(54) FIBER OPTIC BRAGG GRATING PRESSURE SENSOR

(76) Inventors: Arthur D. Hay, 35 Brookside Pl., Cheshire, CT (US) 06410; Alan D. Kersey, 75 Taylor Town Rd., South Glastonbury, CT (US) 06073; Robert J. Maron, 1 Mohawk Ct., Cromwell, CT (US) 06416; Phillip Edmund Pruett, 7 Kovacs Pl., Wallingford, CT (US) 06492; Mark R. Fernald, 35 Tyler Rd., Enfield, CT (US) 06082; Guy A. Daigle, 150 Pickney Ave., Plainville, CT (US) 06062; F. Kevin Didden, 391 S. Main St., Wallingford, CT (US) 06492; Allen R. Davis, 254 Old Stage Rd.; Michael A. Davis, 172 Stevens La., both of Glastonbury, CT (US) 06033; Timothy J. Bailey, 703 Maple Rd., Longmeadow, MA (US) 01106

( * ) Notice: Subject to any disclaimer, the term of this patent is extended or adjusted under 35 U.S.C. 154(b) by 0 days.

(21) Appl. No.: 09/399,504

(22) Filed: Sep. 20, 1999

Related U.S. Application Data

(63) Continuation-in-part of application No. 09/205,848, filed on Dec. 4, 1998, now abandoned.

(51) Int. Cl.$^7$ ................................................ G02B 6/00
(52) U.S. Cl. ............................ 385/13; 385/14; 385/15
(58) Field of Search ................................. 385/13, 14.15, 385/16, 37, 96; 250/227.21; 372/6

(56) References Cited

U.S. PATENT DOCUMENTS

| | | | |
|---|---|---|---|
| 4,636,031 | 1/1987 | Schmadel, Jr. et al. | 350/96.19 |
| 4,915,467 | 4/1990 | Berkey | 350/96.15 |
| 5,007,705 | 4/1991 | Morey et al. | 350/96.29 |
| 5,026,984 | * 6/1991 | Gerdt | 250/227.21 |
| 5,042,898 | 8/1991 | Morey et al. | 385/37 |

(List continued on next page.)

FOREIGN PATENT DOCUMENTS

| | | |
|---|---|---|
| 19648403 | 4/1998 | (DE) . |
| 0359351 | 9/1992 | (EP) ............................. C03B/37/15 |
| 305004 | 6/1997 | (NO) . |
| WO 99 32912 | 3/1998 | (WO) . |
| WO 98 31987 | 7/1998 | (WO) . |
| WO 99 44026 | 2/1999 | (WO) . |
| WO 99 13307 | 3/1999 | (WO) . |

OTHER PUBLICATIONS

M.G. Xu, . Geiger and J. P. Dakin for "Fibre grating pressure sensor with enhanced sensitivity using a glass–bubble housing"—Electronics Letters—18$^{th}$ Jan. 1996 vol. 32, No. 2.

(List continued on next page.)

*Primary Examiner*—Mohammad Sikder

(57) ABSTRACT

A fiber optic Bragg grating pressure sensor particularly suited for measuring ambient pressure of a fluid includes a pressuring detecting device 12 such as a glass element whose elastic deformation is proportional to applied pressure. An optical fiber 28 with an integral first grating 33 is wrapped at least once around the device and has at least a portion of its length fused to the device 12 such that elastic deformation of the device 12 generates a corresponding axial strain in the fiber 28 and/or the grating 33 and thus a corresponding change of the fiber length and/or characteristic reflectance wavelength of the grating 33. A second grating 35 may be formed near the pressure detecting device 12 so as to sense ambient temperature but not be affected by deformation of the device 12 for temperature compensation. Also, the fiber 28 may have more than one grating or be doped at least between a pair of gratings 160,162, to form a fiber laser or a DFB fiber laser which lasing wavelength changes with changing pressure.

22 Claims, 4 Drawing Sheets

U.S. PATENT DOCUMENTS

| | | | |
|---|---|---|---|
| 5,235,659 | 8/1993 | Atkins et al. | 385/124 |
| 5,367,589 | 11/1994 | MacDonald et al. | 385/37 |
| 5,399,854 | 3/1995 | Dunphy et al. | 250/227.17 |
| 5,469,520 | 11/1995 | Morey et al. | 385/37 |
| 5,511,083 | 4/1996 | D'Amato et al. | 372/6 |
| 5,512,078 | 4/1996 | Griffin | 65/484 |
| 5,578,106 | 11/1996 | Fleming, Jr. et al. | 65/391 |
| 5,682,453 | 10/1997 | Daniel et al. | 385/99 |
| 5,684,297 | 11/1997 | Cable | 250/227.14 |
| 5,691,999 | 11/1997 | Ball et al. | 373/20 |
| 5,745,626 | 4/1998 | Duck et al. | 385/96 |
| 5,771,251 | 6/1998 | Kringlebotn et al. | 372/6 |
| 5,841,131 | 11/1998 | Schroeder et al. | 250/227.17 |
| 5,844,667 | 12/1998 | Maron | 356/35.5 |
| 5,844,927 | 12/1998 | Kringlebotn et al. | 372/7 |
| 5,987,995 * | 11/1999 | Sawatari et al. | 73/705 |
| 6,160,762 | 12/2000 | Luscombe et al. | 367/149 |

OTHER PUBLICATIONS

Quartzdyne, Inc., Series QU/QG Spec Specification Sheet and p. 6, Section 1, General Information taken from Quartzdyne Pressure Transducers General Catalog and Operating Manual for Quartzdyne Downhole High Pressure Transducers (Series QU, QG, QL, TMC, 1XP and LP) Apr. 1, 1997.

"The Thickness–Shear Quartz Resonator: A Rugged, Precision Pressure Transducer" Product Feature from Sensors, Jul. 1990.

"Design of DFB fibre lasers", V. C. Lauridsen et al, Electron. Lett., vol. 34, No. 21, pp. 2028–2030, 1998.

"Erbium doped fibre DFB laser with permanent $\pi/2$ phase–shift induced by UV post–processing", P. Varming et al, IOOC 95, Tech. Digest, vol. 5, PD1–3, 1995.

* cited by examiner

FIBER OPTIC BRAGG GRATING PRESSURE SENSOR

CROSS REFERENCE TO RELATED APPLICATIONS

This is a continuation-in-part of U.S. patent application, Ser. No. 09/205,848, filed Dec. 4, 1998 (now abandoned). Also, U.S. patent applications, Ser. No. 09/399,404, entitled "Tube-Encased Fiber Grating Pressure Sensor" (now abandoned); Ser. No. 09/399,495 entitled "Tube-Encased Fiber Grating" (now abandoned); Ser. No. 09/400,364, entitled "Tube-Encased Strain-Isolated Fiber Grating Temperature Sensor" (now abandoned); and Ser. No. 09/400,363, entitled "Tube-Encased Pressure-Isolated Fiber Grating Temperature Sensor" (now abandoned), all filed contemporaneously herewith, and Ser. No. 09/205,845, entitled "Method and Apparatus for Forming a Tube-Encased Bragg Grating", filed Dec. 4, 1998 all contain subject matter related to that disclosed herein, which are incorporated herein by reference.

TECHNICAL FIELD

The present invention relates to fiber optic pressure sensors, and in particular to such sensors that use a separate pressure detecting device.

BACKGROUND OF THE INVENTION

There are many processes and environments in which it is desirable to know the ambient pressure and in which a sensor is used in order to monitor same. One such common process is during exploration and production of hydrocarbons such as oil in which it is necessary to measure the pressure of the hydrocarbons in a reservoir. Another application is the measurement of the fluid pressure associated with pumps or natural drivers for transporting such hydrocarbons from one location to another. Pressure drops across a venturi is one means by which flow of a fluid can be detected, which therefore requires detection of the pressure difference on both sides of such a venturi.

Pressures of such fluids are traditionally measured with a quartz crystal based pressure measuring devices such as that manufactured by Quartzdyne, Inc. of Salt Lake City, Utah as the Quartzdyne™ Series QS High Pressure Laboratory Transducer. Such a pressure measuring device measures the change in mechanical oscillation frequency associated with the elastic deformation of the crystal in response to applied pressure. Quartz is the medium of choice for such applications due to inherent long term stability, as well as its minimal creep and hysteresis properties. The change in frequency with temperature is also very predictable.

Traditionally the change in frequency of the quartz crystal is measured and compared to a reference crystal which is temperature compensated with the resulting data correlated and calibrated to a direct pressure measurement. Although the reliability of such a quartz crystal is extremely high, the electronics required to measure frequency change are subject to failure particularly when the transducer and its associated electronics are subjected to elevated temperatures such as above 125° C.

Certain techniques exist for measuring pressure using a Bragg grating. However, such techniques are either complex, costly, or do not constrain the optical fiber from buckling in the grating region.

For example, a fiber optic grating based sensor is described in U.S. patent application Ser. No. 08/925,598 entitled "High Sensitivity Fiber Optic Pressure Sensor for Use in Harsh Environments" to Robert J. Maron. In that case, an optical fiber is attached to a compressible bellows at one location along the fiber and to a rigid structure at a second location along the fiber with a Bragg grating embedded within the fiber between these two fiber attachment locations and with the grating being in tension. As the bellows is compressed due to an external pressure change, the tension on the fiber grating is reduced, which changes the wavelength of light reflected by the grating. Such a sensor requires a complex bellows structure and does not constrain the fiber from buckling in the grating region.

Another example is described in Xu, M. G., et al, "Fibre grating pressure sensor with enhanced sensitivity using a glass-bubble housing", Electronics Letters, 1996, Vol. 32, pp. 128–129, where an optical fiber is secured by UV cured cement to a glass bubble at two ends with a grating inside the bubble. However, such a sensor does not constrain the optical fiber against buckling in the region of the grating.

It is also known that a grating-based pressure sensor may be made by placing a polarization maintaining (PM) optical fiber in a capillary tube having rods therein, and measuring changes in grating birefringence caused by changes in the transverse strain on the fiber grating due to transverse pressure forces acting on the capillary tube, as is discussed in U.S. Pat. No. 5,841,131, to Schroeder et al., issued Nov. 24, 1998. However, such a technique may be expensive or complex to implement.

It is therefore desirable to have a fiber optic Bragg grating pressure sensor that can measure the elastic deformation of a pressure detecting device while minimizing non-axial (or transverse) movement of the optical fiber in the region of the Bragg grating.

SUMMARY OF THE INVENTION

Objects of the present invention include provision of a fiber optic Bragg grating pressure sensor that directly senses pressure due to elastic defonnation of a sensing device.

According to the present invention, a fiber optic pressure sensor comprises a pressure detecting device that is elastically deformable as a function of applied pressure; and an optical fiber being wrapped at ;east once around the device and having at least a portion of its length fused to the device such that elastic deformation of the device imparts an axial strain along a longitudinal axis of the fiber due to the applied pressure.

According further to the present invention, the device has a cylindrical geometry, and may be solid or have an axial bore formed therein. According further to the present invention, the fiber has at least one grating disposed therein. In still further accord to the present invention, the grating has a characteristic wavelength that changes as applied pressure changes. According still further to the present invention, the device compreises silica or quartz.

The present invention provides an improvement over the prior art by fusing a fiber and/or grating directly to a sensing device (or element) and/or by fusing the fiber to the device on opposite axial sides of the grating area adjacent to or a predetermined distance from the grating and radially contraining the grating area. Also, one or more gratings, fiber lasers, or a plurality of fibers may be attached to the device. The grating(s) or laser(s) may be attached to the device within, partially within, or to the outer surface of the device. The sensing device is elastically deformable based on applied pressure.

Thus, when the device is elastically deformed due to the ambient pressure of the environment surrounding the device, this elastic deformation is imparted to the grating. This elastic deformation of (or strain on) the device causes a strain along the longitudinal axis of the fiber grating which causes reflection wavelength of the grating to be proportionately changed. The sensing device may be made of a glass material.

Further, the invention may be used as an individual (single point) sensor or as a plurality of distributed multiplexed (multi-point) sensors. Also, the invention may be a feed-through design or a non-feed-through design.

The invention may be used in harsh environments (high temperature and/or pressure), such as in oil and/or gas wells, engines, combustion chambers, etc. In one embodiment, the invention may be an all glass sensor capable of operating at high pressures (>15 kpsi) and high temperatures (>150° C.). The invention will also work equally well in other applications independent of the type of environment.

The fiber grating may be attached to the device by direct fusing or by using a glass solder (e.g., silica solder), or other means which maintain the optical fiber and/or grating fixedly secured to the device. The means of attachment may allows the fiber and/or grating to remain securely attached at temperatures much higher or lower than ambient, depending on the application.

Also, an additional temperature grating which is at the same temperature as but not attached to the device may be provided to provide for temperature compensation of the pressure grating. The temperature grating can be formed in the same optical fiber as the pressure grating or can be formed in a second optical fiber that is coupled to the first optical fiber.

For any of the embodiments shown herein, the grating may be attached to the device having an initial pre-strain on the grating (compression or tension) or no pre-strain.

The foregoing and other objects, features and advantages of the present invention will become more apparent in light of the following detailed description of exemplary embodiments thereof.

MODE FOR CARRYING OUT THE INVENTION

Figure 1:
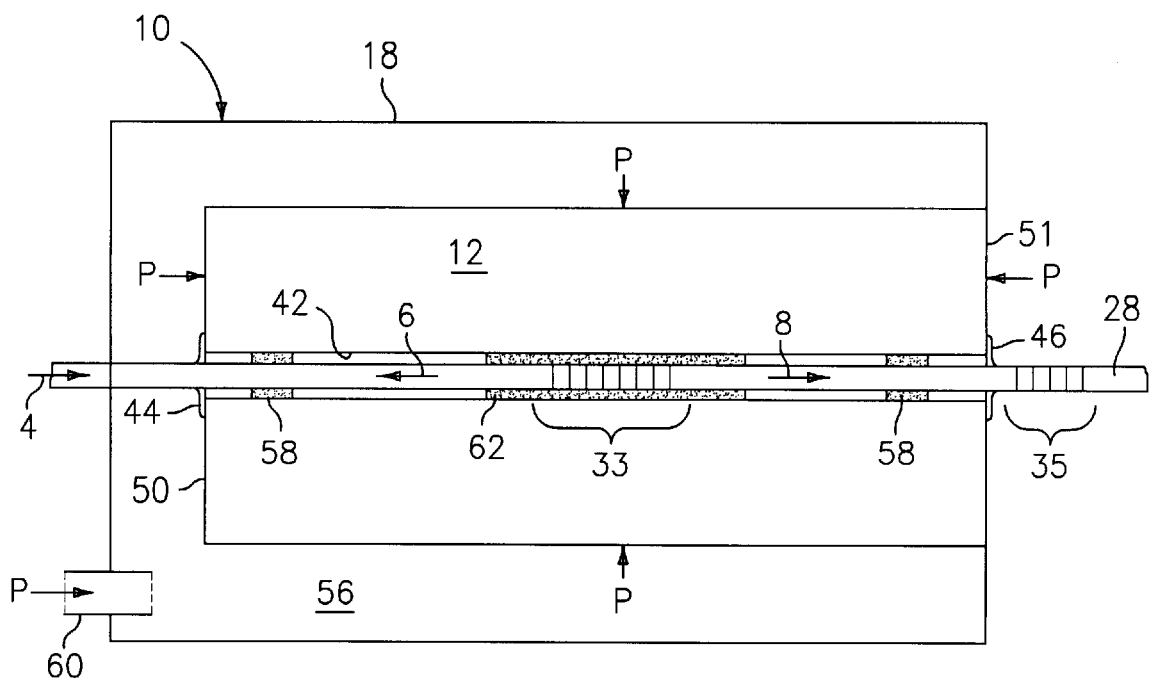
FIG. 1 is a cross-sectional view of a fiber optic Bragg grating pressure sensor according to the present invention.

Referring to FIG. 1, a fiber Bragg grating pressure sensor 10 comprises a known optical waveguide 28, e.g., a standard telecommunication single mode optical fiber, having a Bragg grating 33 impressed (or embedded or imprinted) in the fiber 28. The fiber 28 has an outer diameter of about 125 microns and comprises silica glass ($SiO_2$) having the appropriate dopants, as is known, to allow light 4 to propagate along the fiber 28. The grating 33 is similar to that described in U.S. Pat. No. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention. However, any wavelength-tunable grating or reflective element embedded, etched, imprinted, or otherwise formed in the fiber 28 may be used if desired. As used herein, the term "grating" means any of such reflective elements. Further, the reflective element (or grating) 33 may be used in reflection and/or transmission of light.

Other materials and dimensions for the optical fiber or waveguide 28 may be used if desired. For example, the fiber 28 may be made of any glass, silica, phosphate glass or other glasses, or made of glass and plastic or plastic, or other materials used for making optical fibers. For high temperature applications, optical fiber made of a glass material is desirable. Also, the fiber 28 may have an outer diameter of 80 microns or other diameters. Further, instead of an optical fiber, any optical waveguide may be used, such as, a multi-mode, birefringent, polarization maintaining, polarizing, multi-core, or multi-cladding optical waveguide, or a flat or planar waveguide (where the waveguide is rectangular shaped), or other waveguides. As used herein the term "fiber" includes the above described waveguides.

The light 4 is incident on the grating 33 which reflects a portion thereof as indicated by a line 6 having a predetermined wavelength band of light centered at a reflection wavelength $\lambda 1$, and passes the remaining wavelengths of the incident light 4 (within a predetermined wavelength range), as indicated by a line 8.

Figure 1A:
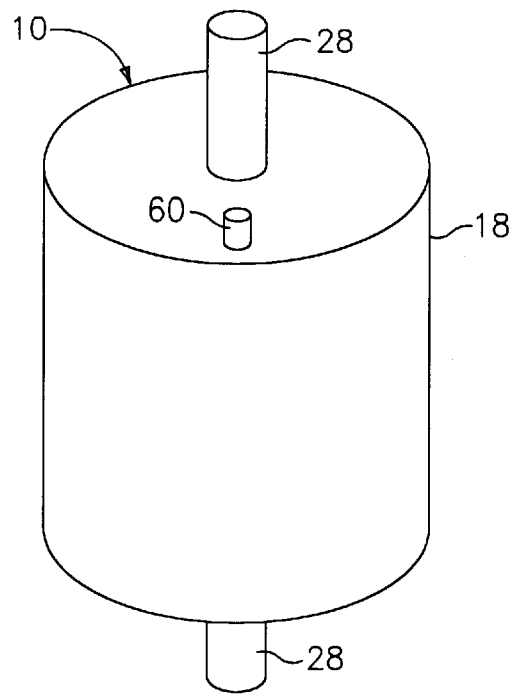
FIG. 1A is a perspective view of the pressure sensor shown in FIG. 1.

Referring to FIGS. 1 and 1A, the optical fiber Bragg grating pressure sensor 10 according to the present invention includes a pressure detection device (or sensing element) 12, which preferably is made of a glass material, such as synthetic or natural quartz (crystal), fused silica, silica ($SiO_2$), Pyrex® by Corning (boro silicate), or Vycor® by Corning (about 95% silica and 5% other constituents such as Boron Oxide), or other glasses. The shape of the device 12 may be a solid cylindrical shape as shown in FIG. 1. The device 12 may have cross-sectional shapes other than circular, such as square, rectangular, elliptical, clam-shell, or other shapes, and may have side-view sectional shapes other than rectangular, such as circular, square, elliptical, clamshell, or other shapes. Other shapes can be used, such as described herein or those described in the cross-referenced, U.S. patent application, Ser. No. 09/205,944 entitled "Tube-Encased Fiber Grating Pressure Sensor" (now abandoned). The device 12 is typically mounted in a housing 18 that forms a pressurized chamber 56 that imparts external pressure P to the device 12. The pressure P is applied to the pressure detecting device 12 by passage of the surrounding fluid through port 60. The pressure P elastically deforms the pressure detecting device 12 proportional to the pressure P. Alternatively, the housing 18 may have a known diaphragm or bellows (not shown) which mechanically imparts the pressure P exerted thereon to the pressure detecting device, such as to end faces 50 and 51.

Other types of housings and techniques for attaching or suspending the sensing device 10 to or within the housing, including those shown in the cross-referenced Patent Applications, can be used to directly or indirectly apply ambient pressure to a pressure detecting device 12. Also, the chamber 56 may be filled with ambient air, or they may be partially or completely filled with a fluid (liquid or gas), e.g., an oil. The type of filling fluid will depend on the desired thermal time constant, viscosity, and other fluid properties based on the desired application. In addition, as shown in FIG. 2, the nature of the present invention does not require a housing at all but may be placed directly in the pressure environment to be measured, so long as the pressure detecting device can withstand the environmental conditions.

Figure 2:
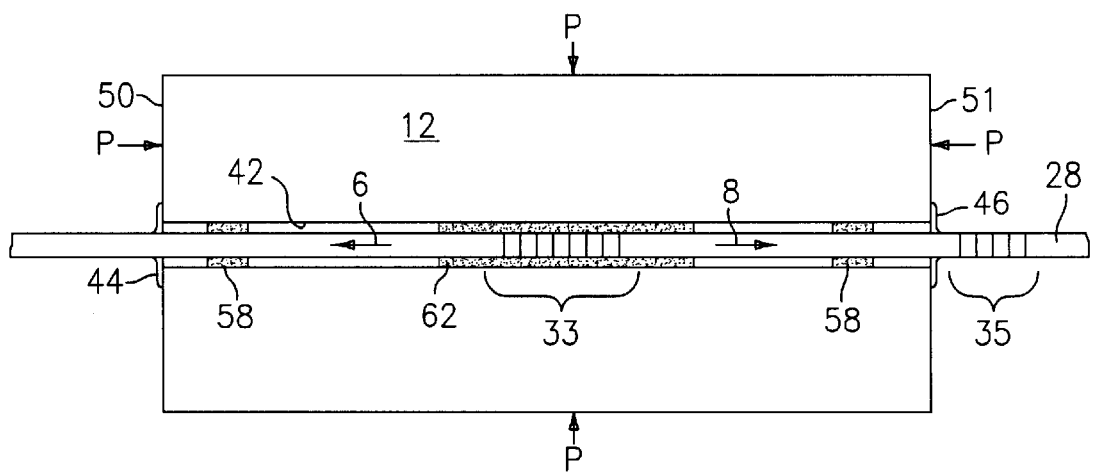
FIG. 2 is a cross-sectional view of a fiber optic Bragg grating pressure sensor without an associated housing.

Referring to FIGS. 1 and 2, the pressure detecting device 12, contains a central bore 42 formed within the device 12 having a diameter sufficient for receipt of the portion of the fiber 28 containing the grating 33. The fiber 28 where the grating 33 is located is attached (or secured) to the interior wall of the bore 42 as shown by the region 62 such that elastic deformation of the device 12 imparts a corresponding elastic deformation to the Bragg grating.

The attachment of the optical fiber to the device 12 (for high temperature applications) is preferably achieved by fusing the optical fiber to the device by means of a glass (powder or solid), laser glass weld, or similar material or technique. Other techniques can be used to fuse the optical fiber to the device, such as heating and fusing the fiber 28 to the device 12, as discussed in aforementioned U.S. patent application, Ser. No. 09/205,943 (now abandoned), or other techniques.

If fusing is used to attach the fiber 28 to the device 12, the device 12 should be made of a material such that the device 12 (or the inner diameter surface of the bore hole 42 in the device 12) can be fused to (i.e., create a molecular bond with, or melt together with) the outer surface (or cladding) of the optical fiber 28 such that the interface surface between the inner diameter of the bore 42 and the outer diameter of the fiber 28 become substantially eliminated (i.e., the inner diameter of the bore 42 cannot be distinguished from and becomes part of the cladding of the fiber 28).

Referring to FIGS. 1 and 2, alternatively, instead of attaching the fiber 28 to the device 12 at the location 62 of the grating 33, the fiber 28 in the bore 42 may be attached on opposite axial sides of the grating 33. In that case, the portion of the optical fiber 28 where the grating 33 is formed is significantly radially constrained with respect to the pressure detecting device 12 by dimensioning the bore 42 to significantly limit radial movement of the Bragg grating (e.g., by making the bore hole 42 about 0.1 to 10 microns greater than the diameter of the fiber 28).

For example, the fiber may be attached to the bore 42 at the regions 58. Alternatively, the optical fiber 28 may be secured at a first region 44 to end face 50, using techniques discussed hereinbefore. Alternatively, this first region 44 may be a nipple circumferentially formed around the opening of bore 42 as part of the device 12 or made of a separate material. The nipple can then be attached to the fiber 28 using the techniques discussed herein. Alternatively, the exposed region of the fiber 28 can be metal plated and subsequently metal soldered to end face 50 at region 44. Other known techniques for securing the optical fiber to the crystal end face could be used. Once the fiber 28 is secured to end face 50, it is secured to end face 51 at region 46 in a similar way. Alternatively, the fiber 28 and grating 33 can be attached to the device along the entire length of bore 42.

For any of the embodiments described herein, the fiber 28 can be placed under tension prior to its secured attachment to end face 51. Also, the fiber 28 may have an initial pre-strain of tension or compression or no pre-strain. The amount of pre-tensioning depends upon the anticipated thermal conditions the transducer is expected to experience as compared to the ambient temperature at the time of fiber attachment, the pressure range, and other factors.

Instead of attaching the grating 33 in tension, the fiber 28 may be secured to the device 12 in compression. In order to achieve this result, the fiber 28 can be secured at one end, such as end face 50, by means of attaching (or fusing) to the nipple region 44 as discussed hereinbefore or by any other means of attachment. The other end of the fiber can be similarly secured to the device at end face 51 at region 46. If this securement is performed with the device 12 at a higher temperature than the fiber 28, then the grating 33 within bore 42 will be under slight compression due to the slight thermal contraction of the device 12 when it is at normal operating temperature. Other techniques to place the grating in compression may be used as is discussed in the aformentioned copending patent applications. Alternatively, the fiber grating may be attached in tension or compression as is described in the cross-referenced patent application Ser. No. 09/205,943, entitled "Tube-Encased Fiber Grating" (now abanboned).

Figure 3:
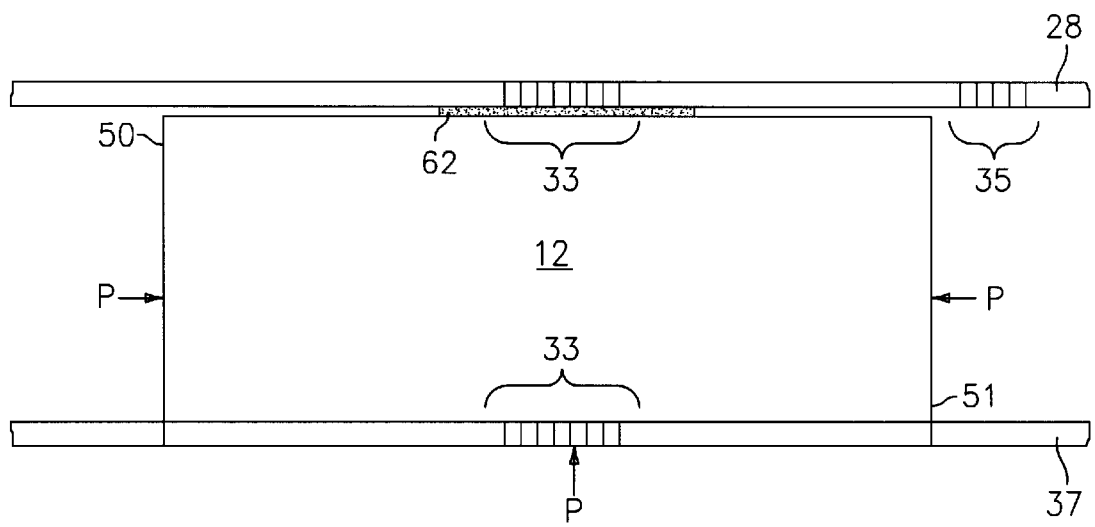
FIG. 3 is a side view of a pressure sensor where the Bragg grating portion of the optical fiber is attached to the exterior of the pressure detecting device.

Referring to FIG. 3, alternatively, the optical fiber 28 can also be attached in the region 62 of the grating 33 to the exterior of the pressure detecting device 12. Such attachment can be achieved by the techniques discussed hereinbefore. For maximum sensitivity, such attachment to the device 12 should be along an axis of the device 12 that is maximally deformed with respect to ambient pressure changes. Alternatively, the fiber 28 may be fused partially or completely into the outer surface of the device 12, as indicated by a fiber 37. In that case, the surface of the device 12 and/or the fiber 28 is heated (e.g., by a laser, flame, filament or other heating means) until soft enough for the fiber 28 to be fused into or onto the surface of the device 12.

Figure 4:
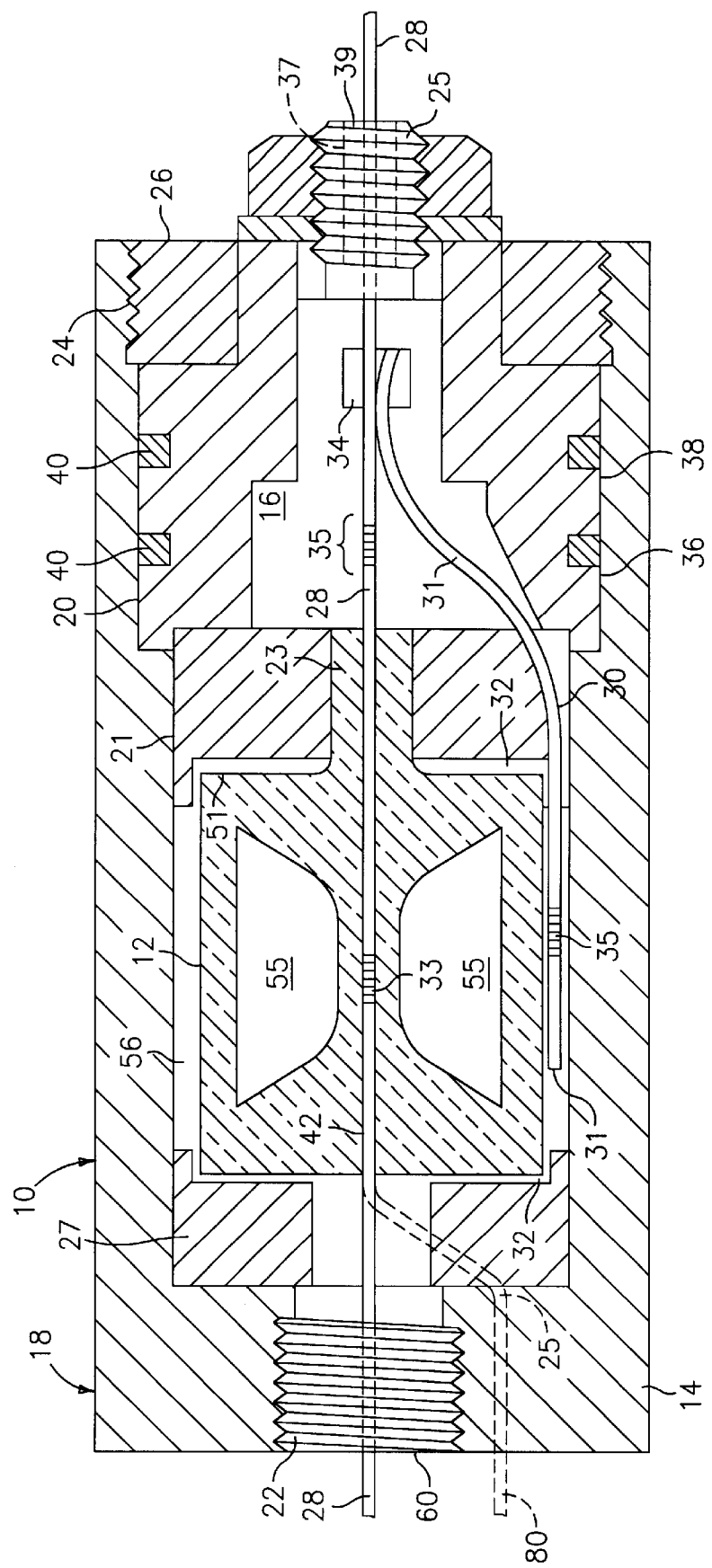
FIG. 4 is a cross-sectional view of a pressure sensor where the pressure detecting device has a second physical configuration.

Referring to FIG. 4, an alternative embodiment for the pressure sensor 10 is shown where certain housing details are shown and where the pressure detecting device 12 is cylindrically symmetric but also includes a toroidially shaped void 55. This geometry of the device 12 may exhibit enhanced sensitivity to pressure. The housing also has inner spacers 21,27, attached to the inner walls of the housing 18. There is a gap 32 between the spacers and the device 12 for the fluid pressure to be exerted on the device 12. The device 12 is mounted to the housing 18 in a neck-down region 23 of the device 12 to the spacer 21 or directly to the outer housing 18. Also, instead of the neck-down region 23 the end face 51 of the device 12 may be mounted directly to the spacer 21 or to the housing 18. The housing 18 may also include an optical fiber mount 20 having a pressure isolated inner cavity 16 to provide some slack or service loop for the fiber 28 and/or where a fiber coupler 34 may be located if the second fiber 31 is coupled to the fiber 28. Also, the mount 20 is attached to the housing 18 and/or the spacer 21, and may have circumferential apertures 36,38 for receipt of O-rings 40 to provide a hermetic seal between the housing interior and outside environment.

The housing 18 has threaded apertures 22,25 for securing bolts for pressure and/or optical connectors (not shown), and a threaded aperture 24 for securing a nut 26 to the housing 18. The aperture 22 acts as the pressure port 60, and may also act as a feed-through for the fiber 28. Alternatively, the fiber 28 may pass through a bore 25 in the spacer 27 and an outer wall 14 of the housing 18, in which case the fiber 28 would be hermetically sealed to the bore 25 at the exit point. Also the nut 26 may be used to secure the mount 20 inside the housing 18.

An inner sleeve 37 may be used that passes through the threaded aperture 25 and through which the fiber 28 passes and which provides a hermetic feedthrough 39 for the fiber 28. Also, the optical fiber 28 is attached to the device 12 either through the bore hole 42 or onto or into the surface of the device 12, as described herein.

Although a description of an example detailed housing is described with respect to FIG. 4, these details are not required for the operation of the present invention. Alternatively, the device 12 may have any of the other geometries discussed herein.

Figure 5:
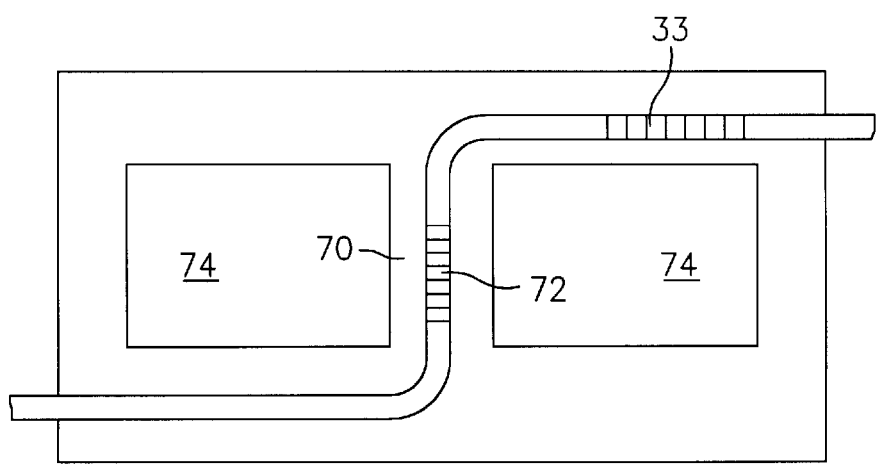
FIG. 5 is a cross-sectional view of an alternative fiber optic Bragg grating pressure sensor according to the present invention.

Referring to FIG. 5, an alternative geometry for the device 12 is shown having a vertical bridge 70 across an opening 74 in the device 12. In that case, an additional grating 72 attached to the bridge 70 may be used in addition to or instead of the grating 33. The attachment may be any of the techniques described herein.

For any of the embodiments shown herein, the fiber 28 may pass through the pressure detecting device 12 so as to be connected to additional pressure detecting devices (not shown) in a pass-through arrangement. Alternatively, the fiber 28 may terminate on or slightly beyond the pressure detecting device in a non-pass-through arrangement.

Referring to FIGS. 1,3,4 the reflection wavelength of the grating 33 changes with temperature ($_{\Delta\lambda}/_\Delta T$), as is known. Also, the strain on the grating 33 may change over temperature due to a thermal mismatch between the device 12 and the fiber 28 over temperature. In that case, a separate temperature grating 35 may be used to measure temperature to correct for temperature-induced shifts in the reflection wavelength of the pressure grating 33. The temperature grating 33 has a reflection wavelength that is different from the reflection wavelength of the pressure grating 33, that changes with change in temperature and does not change due to a change in the pressure P. This is achieved by locating the temperature grating 35 in thermal proximity to the pressure grating 33, outside the pressure-strained region of the device 12 and otherwise isolated from the pressure being measured. For example, in FIG. 4, the temperature grating 35 may be located in the fiber 28 in the cavity 16 between the device 12 and the feed-through 39.

Alternatively, the temperature grating 35 may be in a separate optical fiber 31 (FIG. 4) located near or in the sensor housing 18 and may be optically coupled to the fiber 28, e.g., by an optical coupler 34, or remain separate from the fiber 28. In FIG. 4, the second fiber 31 may pass through a bore 39 in the spacer 21.

Alternatively, the temperature grating 35 may be a strain-isolated temperature sensor, such as that described in cross-referenced commonly-owned, copending U.S. patent application, Ser. No. 09/205,847, entitled, "Tube-Encased Strain-Isolated Fiber Grating Temperature Sensor" (now abandoned). Alternatively, the temperature grating 35 may be a pressure-isolated temperature sensor such as is discussed in the cross-referenced copending U.S. patent application, Ser. No. 09/205,942, entitled "Tube-Encased Pressure-Isolated Fiber Grating Temperature Sensor" (now abandoned). Alternatively, the temperature grating 35 may be located in a non-pressure-isolated area (e.g., if the cavity 16 is subjected to the measurement pressure), where both the gratings 33,35 are subjected to pressure and temperature variations where the pressure-to-wavelength shift sensitivities for the gratings 33,35 are different. Thus, pressure and temperature can be analytically determined. Alternatively, if the change in wavelength with temperature is the same (or predictable) for both gratings 33,35, and the change in wavelength with pressure is different for the two gratings 33,35, then a temperature-compensated pressure measurement can be obtained analytically, e.g., by subtracting the two wavelengths.

Alternatively, instead of using a fiber grating to measure the temperature of the device 12, any other technique may be used to determine the temperature of the device 12, e.g., electronic, thermocouple, optical, etc.

Figure 6:
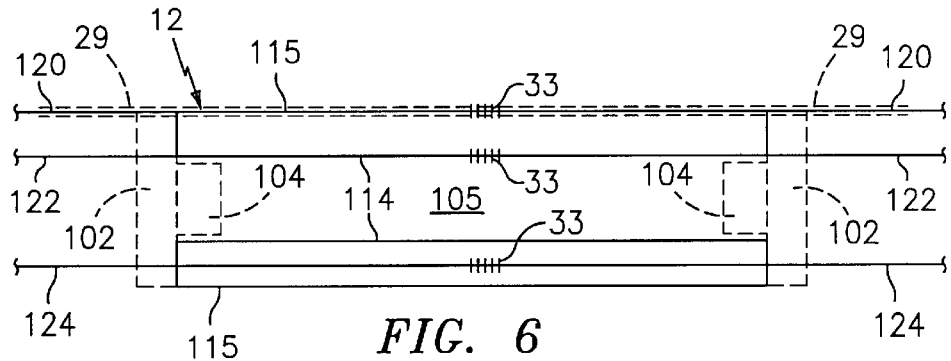
FIG. 6 is a cross-sectional view of an alternative fiber optic Bragg grating pressure sensor according to the present invention.
Figure 8:
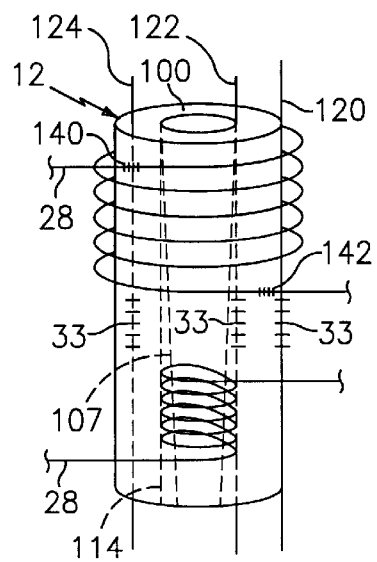
FIG. 8 is a partial perspective view of the fiber optic Bragg grating pressure sensor of FIGS. 6 and 7, according to the present invention.

Referring to FIGS. 6,8, the pressure detecting device 12 may be a hollow cylinder 100. In that case, the device 12 may have one or both axial ends open, or may be sealed by end caps 102. The end caps 102 may be on the outside of the device 12 and/or may be inside as indicated by dashed lines 104 and may be fused to the outer cylinder 100. The end caps 102,104 form a sealed chamber 105. Also, the end caps may be made of the same material as the cylinder 100 or a different material capable of being hermetically sealed to the cylinder 100 to create the chamber 105. Also, the fiber 28 may be attached to the device 12 on the outer surface 115 as indicated by the line 120 or the inner surface 114 as indicated by the line 122 (or partially or completely into the surfaces 114 or 115), or in the wall as indicated by the line 124.

Figure 7:
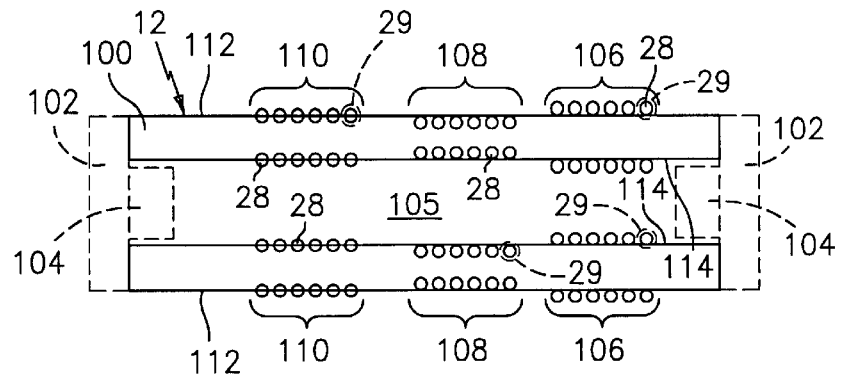
FIG. 7 is a cross-sectional view of an alternative fiber optic Bragg grating pressure sensor according to the present invention.

Referring to FIGS. 7,8, alternatively, instead of the fiber 28 being oriented along the longitudinal axis of the device 12, the fiber may be wrapped radially around the device 12. In that case, the device 12 resembles a mandrel. In particular, the fiber may be wrapped around and attached to the outside wall 112, or the inside wall 114, by any of the techniques discussed hereinbefore. Also, the fiber may be attached to the surface of the walls 112,114, as indicated by the wraps 106, using any of the techniques discussed herein. Alternatively, the fiber may be fused into the surface of the walls 112,114, as indicated by the wraps 108, or fused partially into the surface of the walls 112,114, as indicated by the wraps 110. The fiber 28 may be fused onto, or partially or completely into the surface of the cylinder 12 as discussed hereinbefore.

Alternatively, referring to FIGS. 6,7, the fiber 28 and/or grating(s) 140,142 may have a glass tube 29 fused to the fiber 28 prior to wrapping and fusing to the mandrel 12. The tube 29 may be fused to the fiber 28 as is discussed in the aforementioned patent application Ser. No. 09/205,943 (now abandoned). In that case, the tube-encased fiber 28 may be heated and fused to the mandrel by heating the tube 29 and the mandrel 12 in the region to be fused.

In that case, there may be more than one grating 140,142 may be embedded in the fiber 20. The fiber 28 may be attached to the mandrel 12 along the entire length of the fiber 28 including the gratings 140,142, or only at the gratings 140,142, or only along the fiber 28 between the gratings 140,142, or only outside the gratings 140,142. The gratings 140,142, may be used, individually in a known Fabry Perot arrangement or to form a fiber laser, as discussed hereinafter.

The thickness of the walls of the outer cylinder 100 are determined by the desired sensitivity, the range of pressure to be seen and the type of material used, or other factors. Also, the inner wall 114 of the chamber 105 may be a tapered bore as indicated by dashed lines 107, which would provide different pressure sensitivity but the same temperature sensitivity along the cylinder, for fibers wrapped on the outside wall 112.

The chamber 105 may be filled with ambient air, or it may be evacuated (or be at another pressure), or they may be partially or completely filled with a fluid (liquid or gas), e.g., an oil. The type of filling fluid will depend on the desired thermal time constant, viscosity, and other fluid properties based on the desired application.

Alternatively, instead of the cylinder 100 having a hollow center, the cylinder may be a solid cylinder mandrel. In that case, the fibers 28 would be wrapped radially only around the outside wall 112 and the end caps 102,104 would not be needed.

Figure 9:
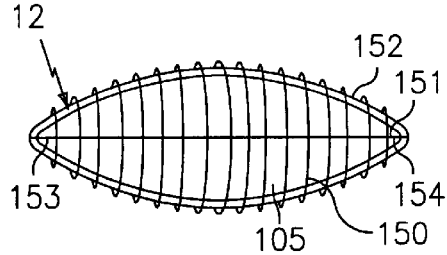
FIG. 9 is a side cross-sectional view of an alternative geometry for a pressure sensing device, according to the present invention.
Figure 10:
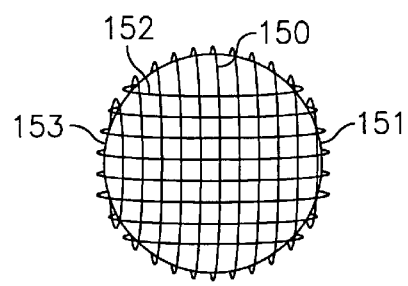
FIG. 10 is a top view of the alternative geometry of FIG. 9, according to the present invention.

Referring to FIGS. 9,10, the device 12 may have a "clam-shell" or elliptical side view shape. In that case, the top view (FIG. 10) may have a circular shape or other shapes (elliptical, square, rectangular, etc.). One or more optical fibers 150,152 may be wrapped around the outside of the clam-shell in any desired directions. Alternatively, an optical fiber 154 may be wrapped around a side-central line 153 of the device 12. Like with the mandrel discussed hereinbefore, the thickness of the shell is determined by the material of the device 12, the desired compliance and other factors. Also, the fibers 150,152,154 may be attached to the device 12 in a similar fashion to that described for the mandrel hereinbefore. Also, one or more of the fibers 150,152 may be wrapped on only one side of the shell if desired.

Although a glass material is preferably used as the pressure detecting device 12, other materials could also be used which have known predictable elastic deformation as a function of applied pressure, such as metals or metal alloys, e.g., titanium, inconel, stainless steel.

Figure 11:
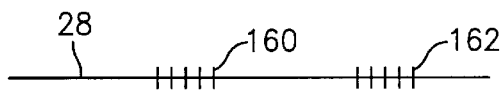
FIG. 11 is a side view of more than one fiber Bragg grating in an optical fiber, which may be used in a pressure detecting device, according to the present invention.

Referring to FIG. 11, for any of the single Bragg gratings shown herein for attachment to the pressure detecting device and for temperature compensation purposes, other fiber grating elements may be used, such as two or more Bragg gratings 160,162 in place of each of the Bragg gratings 33,35 (FIG. 4). In this manner, the multiple gratings 160,162 may be used individually in a known Fabre Perot arrangement. Further, one or both of the gratings 33,35 (FIG. 4) may be replaced by one or more fiber lasers, such as that described in U.S. Pat. No. 5,513,913, entitled "Birefringement Active Fiber Laser Sensor", or U.S. Pat. No. 5,666,372, "Compression Tuned Fiber Laser" may be embedded with the optical fiber 28, which are incorporated herein by reference to the extent necessary to understand the present invention. In that case, one grating is replaced by a pair of gratings 160,162 that form an optical cavity, and the optical fiber at least between the pair of gratings (and may also include the gratings 160,162, and/or the fiber 10 outside the gratings) is doped with a rare earth dopant, e.g., erbium and/or ytterbium, etc., and the lasing wavelength would shift as pressure on the device 12 changes.

Figure 12:
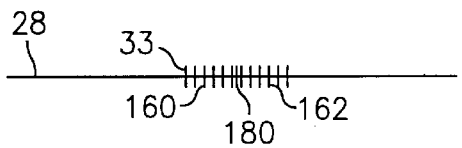
FIG. 12 is a side view of a tunable distributed feedback (DFB) fiber laser which may be used in a pressure detecting device, according to the present invention.

Referring to FIG. 12, another type of tunable fiber laser that may be used with the present invention is a tunable distributed feedback (DFB) fiber laser, such as that described in V. C. Lauridsen, et al, "Design of DFB Fibre Lasers", Electronic Letters, Oct. 15, 1998, Vol.34, No. 21, pp 2028–2030; P. Varming, et al, "Erbium Doped Fiber DGB Laser With Permanent $_\pi/2$ Phase-Shift Induced by UV Post-Processing", IOOC'95, Tech. Digest, Vol. 5, PD1–3, 1995; U.S. Pat. No. 5,771,251, "Optical Fibre Distributed Feedback Laser", to Kringlebotn et al; or U.S. Pat. No. 5,511,083, "Polarized Fiber Laser Source", to D'Amato et al. In that case, the grating 33 is written in a rare-earth doped fiber and configured to have a phase shift of $_\lambda/2$ (where $_\lambda$ is the lasing wavelength) at a predetermined location 180 near the center of the grating 33 which provides a well defined resonance condition that may be continuously tuned in single longitudinal mode operation without mode hopping, as is known. Alternatively, instead of a single grating, the two gratings 160,162 may be placed close enough to form a cavity having a length of $(N + \frac{1}{2})_\lambda$, where N is an integer (including 0) and the gratings 160,162 are in rare-earth doped fiber.

Also, a plurality of the pressure sensors described herein, each having at least one grating 33 encased therein, may be connected in series by the common optical fiber 28 to measure multiple pressure points as distributed sensors. Any known multiplexing techniques may be used to distinguish one sensor signal from another sensor signal, such as wavelength division multiplexing (WDM) or time division multiplexing (TDM) or other multiplexing techniques. In that case, the grating 33 in each sensor may have a different reflection wavelength.

Alternatively, two or more fibers, each having at least one grating therein, respectively, may be attached to the device 12. In that case, the bore hole in the device 12 may be other than circular, e.g., square, triangle, etc. Also, the bore hole for the device 12 need not be centered along the center line of the device 12.

Also, the gratings 33 may be formed in the fiber 28 before or after the fiber is attached to the device 12. Also, the pressure device as may also be a capillary tube having the properties described herein.

Thus what has been described is a pressure sensor particularly suitable for measuring ambient pressure of fluids (liquid or gas) at elevated temperatures. However, the invention will work equally well in any temperature environment. The pressure sensor uses a pressure detecting device in association with a first pressure grating attached thereto for outputting a reflected or transmitted wavelength characteristic of the deformation of the pressure detecting device as a result of applied pressure, which may also have cancellation of deformation changes induced in the pressure detecting device as a result of temperature by means of a second temperature Bragg grating.

Also, it should be understood that, in operation, an instrumentation box (not shown), connected to the optical fiber 28, having a broadband source, a scanned laser light source, or other suitable known optical source, and having a suitable spectrum analyzer or other known opto-electronic measuring equipment, all well known in the art, may be used to provide the incident light 4 and to decode and measure the resultant wavelength or other optical parameter shift of the returned light (reflected light 6 and/or transmitted light 8) from the sensor(s) described herein, such as is described in U.S. Pat. Nos. 5,401,956, 5,426,297, or 5,513,913, or other known optical instrumentation techniques.

It should be understood that, unless otherwise stated herein, any of the features, characteristics, alternatives or modifications described regarding a particular embodiment herein may also be applied, used, or incorporated with any other embodiment described herein. Also, the drawings shown herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A fiber optic pressure sensor, comprising:
    a pressure detecting device comprising a glass material that is elastically deformable as a function of applied pressure; and
    an optical fiber being wrapped at least once around said device and having at least a portion of its length fused to said device such that elastic deformation of said device imparts an axial strain along a longitudinal axis of said fiber due to said applied pressure.

2. The pressure sensor of claim 1 wherein said device has a cylindrical geometry.

3. The pressure sensor of claim 1 wherein said device has an axial bore formed therein.

4. The pressure sensor of claim 3 wherein axial ends of said bore are closed.

5. The pressure sensor of claim 3 wherein said fiber is fused around at least a portion of an inner dimension of said bore.

6. The pressure sensor of claim 3 wherein said bore is filled at least partially with a fluid.

7. The pressure sensor of claim 3 wherein said bore has an inner dimension that tapers radially along a length of said device.

8. The pressure sensor of claim 1 wherein said fiber is fused around at least a portion of an outer dimension of said device.

9. The pressure sensor of claim 1 wherein said fiber has at least one grating disposed therein.

10. The pressure sensor of claim 9 wherein said fiber is fused to said device at least at the location of said grating.

11. The pressure sensor of claim 10 wherein said grating has a characteristic wavelength that changes as applied pressure changes.

12. The pressure sensor of claim 1 wherein said fiber has at least one pair of gratings disposed therein.

13. The pressure sensor of claim 1 wherein at least a portion of said fiber is fused to a glass tube which is fused to at least a portion of said device.

14. The pressure sensor of claim 1 wherein said fiber has at least one pair of gratings and said fiber is doped with a rare earth dopant at least between said pair of gratings to form a fiber laser.

15. The pressure sensor of claim 14 wherein said fiber laser lases at a lasing wavelength which changes as applied pressure changes.

16. The pressure sensor of claim 1 wherein said device comprises silica.

17. The pressure sensor of claim 1 wherein said device comprises quartz.

18. The pressure sensor of claim 1 wherein said fiber has a grating therein and at least a portion of said fiber is doped with a rare earth dopant where said grating is located and said grating is configured to form a DFB fiber laser.

19. The pressure sensor of claim 18 wherein said DFB fiber laser lases at a lasing wavelength which changes as applied pressure changes.

20. The pressure sensor of claim 1 wherein said device comprises a clamshell geometry.

21. The pressure sensor of claim 1 wherein said device comprises a circular cross-section.

22. The pressure sensor of claim 1 wherein said fiber is fused to and embedded within said device.

* * * * *